United States Patent
Buehler et al.

(10) Patent No.: US 10,381,169 B2
(45) Date of Patent: Aug. 13, 2019

(54) AQUEOUS ELECTROLYTE, USE OF THE ELECTROLYTE AND HYBRID SUPERCAPACITOR CONTAINING THE ELECTROLYTE

(71) Applicant: Robert Bosch GmbH, Stuttgart (DE)

(72) Inventors: Elisabeth Buehler, Tamm (DE);
Mathias Widmaier, Magstadt (DE);
Pallavi Verma, Leinfelden (DE);
Severin Hahn, Kirchheim (DE);
Thomas Eckl, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 242 days.

(21) Appl. No.: 15/440,386

(22) Filed: Feb. 23, 2017

(65) Prior Publication Data

US 2017/0250034 A1    Aug. 31, 2017

(30) Foreign Application Priority Data

Feb. 25, 2016 (DE) .................. 10 2016 202 977

(51) Int. Cl.
| | |
|---|---|
| *H01G 11/02* | (2013.01) |
| *H01G 11/04* | (2013.01) |
| *H01G 11/60* | (2013.01) |
| *H01G 11/62* | (2013.01) |
| *H01G 11/64* | (2013.01) |
| *H01G 9/035* | (2006.01) |

(52) U.S. Cl.
CPC ............ *H01G 11/60* (2013.01); *H01G 9/035* (2013.01); *H01G 11/02* (2013.01); *H01G 11/04* (2013.01); *H01G 11/62* (2013.01); *H01G 11/64* (2013.01); *H01M 2300/0002* (2013.01); *Y02E 60/13* (2013.01)

(58) Field of Classification Search
CPC ........ H01G 11/60; H01G 11/64; H01G 11/04; H01G 9/035; H01M 2300/0002
See application file for complete search history.

(56) References Cited

U.S. PATENT DOCUMENTS

7,848,080 B2 * 12/2010 Tsubaki ................. H01G 9/035
                                                         252/62.2
2012/0127632 A1    5/2012 Evans et al.

FOREIGN PATENT DOCUMENTS

GB        2068161 A        8/1981

OTHER PUBLICATIONS

Senthilkumar, et al.; Electric double layer capacitor and its improved specific capacitance using redox additive electrolyte; Journal of Materials Chemistry A; Nov. 21, 2012; pp. 1086-1095; vol. 1; The Royal Society of Chemistry; www.rsc.org/MaterialsA.

* cited by examiner

*Primary Examiner* — C Melissa Koslow
(74) *Attorney, Agent, or Firm* — Norton Rose Fulbright US LLP; Gerard Messina

(57) ABSTRACT

An aqueous electrolyte for a capacitor contains at least one transition metal complex. An aqueous electrolyte containing at least one transition metal complex can be used in a supercapacitor, in a pseudocapacitor, or in a hybrid supercapacitor. A hybrid supercapacitor contains an aqueous electrolyte, which contains at least one transition metal complex.

6 Claims, 1 Drawing Sheet

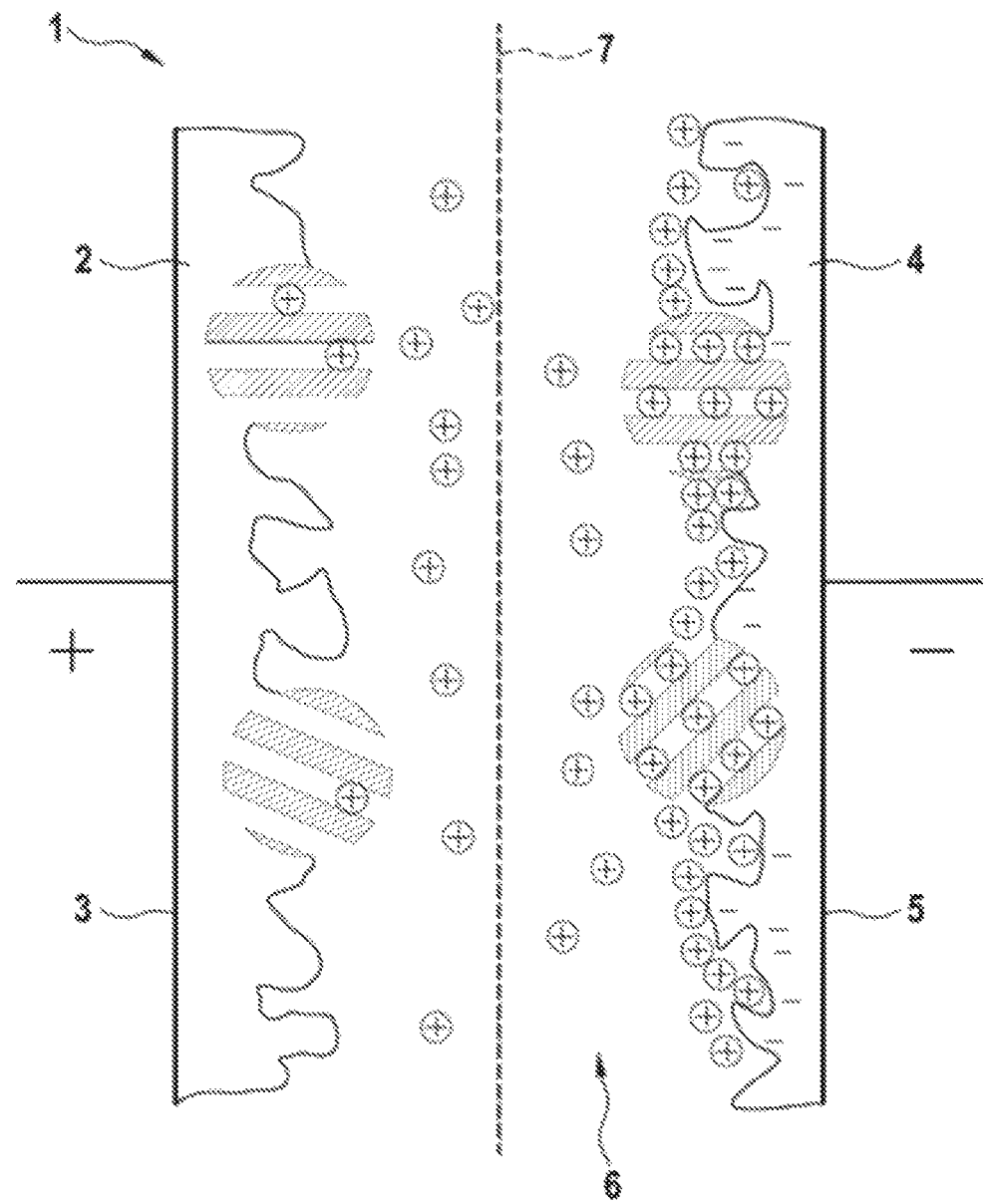

AQUEOUS ELECTROLYTE, USE OF THE ELECTROLYTE AND HYBRID SUPERCAPACITOR CONTAINING THE ELECTROLYTE

This application claims priority under 35 U.S.C. § 119 to patent application number DE 10 2016 202 977.0, filed on Feb. 25, 2016 in Germany, the disclosure of which is incorporated herein by reference in its entirety.

BACKGROUND

The present disclosure relates to an aqueous electrolyte. The present disclosure further relates to the use of the aqueous electrolyte in a supercapacitor, in a pseudocapacitor or in a hybrid supercapacitor. Finally, the present disclosure relates to a hybrid supercapacitor containing the aqueous electrolyte.

Electrochemical energy stores already play an important role in present-day society and will in future become even more important due to the increasing use of alternative energy sources and due to increasing electrification of the automobile industry. Apart from batteries, capacitors are used in particular as electric energy stores. Apart from classical capacitor designs, supercapacitors, pseudocapacitors and hybrid supercapacitors, inter alia, are used today. For the purposes of the present disclosure, supercapacitors are double-layer capacitors in which the electrolyte is the conductive connection between two electrodes. The electrodes consist of carbon or derivatives thereof having a very high static double-layer capacitance. The proportion of faradaic pseudocapacitance in the total capacitance is only small. Pseudocapacitors store electric energy with the aid of reversible redox reactions at electrodes suitable for this purpose. Hybrid supercapacitors (HSC), for example lithium ion capacitors, can use mixtures of a plurality of chemical substances having both faradaic materials and also capacitively active materials as electrode material. The electrodes obtained in this way are referred to as hybridized electrodes.

S. T. Senthilkumar, R. Kalai Selvan, Y. S. Lee, J. S. Melo, Journal Mater. Chem. A, 2013, 1 1086, describes adding a halogen iodide to the electrolyte in order to increase the capacitance of such capacitors even further. Here, pseudocapacitive reactions in which three iodide ions are oxidized to a triiodide ion occur.

SUMMARY

The aqueous electrolyte for a capacitor contains at least one transition metal complex. As a result of redox reactions of the transition metals in the complexes, the electrolyte can function as redox electrolyte which contributes to the capacitance of the capacitor. However, unlike iodide, such complexes do not have a corrosive effect on the electrode materials used in a capacitor.

The transition metal complex preferably contains at least one transition metal selected from the group consisting of cobalt, chromium, iron, copper and titanium. As a result, it makes redox reactions of the redox pairs Co(III)/Co(IV), Co(III)/Co(VI), Cr(II)/Cr(III), Cr(III)/Cr(VI), Fe(II)/Fe(III), Cu(I)/Cu(II) and Ti(III)/Ti(IV) possible. Here, the transition metals have stable oxidation states in aqueous solution.

Furthermore, the transition metal complex preferably contains at least one ligand selected from the group consisting of ammonia ($NH_3$), cyanide ($CN^-$), perchlorate ($ClO_4^-$), thiocyanate ($SCN^-$) and ethylenediaminetetraacetate ($EDTA^{4-}$). The transition metal complex particularly preferably has the formula $ML_x$, where M is the transition metal and L is a ligand selected from the group and x has a value of 2, 4 or 6. In the case of $L=ClO_4^-$, x can, in particular, also have a value of 1 or 3. In the case of $L=EDTA^{4-}$, x can, in particular, also have a value of 1. Apart from the x ligands selected from the group, water molecules can be present as further ligands, so that the complex can have the formula $ML_x(H_2O)_y$, where, for example, $x+y=6$. Such complexes stabilize the transition metal ions of the complexes in aqueous solution and make simple charge transfer possible.

The concentration of the transition metal complex in the aqueous electrolyte is preferably in the range from 0.01 mol/l to 0.5 mol/l. In this way, the capacitance contribution of the electrolyte can be set to suit requirements.

Apart from the transition metal complex, the aqueous electrolyte additionally contains, in particular, sulfuric acid and/or at least one alkali metal salt and/or at least one alkaline earth metal salt. The alkali metal salt can be, for example, lithium sulfate, sodium sulfate, potassium sulfate, potassium chloride, lithium hydroxide, sodium hydroxide, potassium hydroxide or sodium nitrate. Such an addition enables the electrical conductivity of the electrolyte to be adjusted so that it assumes a value suitable for use in a capacitor.

The aqueous electrolyte is, in particular, suitable for use in a supercapacitor, in a pseudocapacitor or in a hybrid supercapacitor.

A hybrid supercapacitor containing the aqueous electrolyte can, in addition to the faradaic and capacitive charge storage at its electrodes, also store electric charge pseudocapacitively in its electrolyte. As a result, it has a particularly high capacitance.

BRIEF DESCRIPTION OF THE DRAWINGS

A working example of the disclosure is shown in the FIGURE and is described in more detail in the following description.

The FIGURE schematically shows the structure of a symmetric hybrid supercapacitor as per a number of working examples of the disclosure.

DETAILED DESCRIPTION

A symmetric hybrid supercapacitor 1 according to various working examples of the disclosure has the structure shown in the FIGURE. A cathode 2 has been applied to a first collector 3. An anode 4 has been applied to a second collector 5. An electrolyte 6 has been introduced between the cathode 2 and the anode 4. A separator 7 separates the cathode 2 from the anode 4. Embedding of $Li^+$ ions into the cathode 2 and into the anode 4 is shown schematically in the FIGURE. Here, the FIGURE shows activated carbon as capacitive electrode material on the surface of which, during charging, negative charge carriers of the electrolyte 6 accumulate at the cathode 2 and on the surface of which positive charge carriers of the electrolyte 6 accumulate at the anode 4. Furthermore, it is shown in four enlargements how the lithium ion cathode material of the cathode 2, in the present case $LiMn_2O_4$, deintercalates $Li^+$ ions and the lithium ion anode material of the anode 4, in the present case $Li_4Ti_5O_{12}$, intercalates $Li^+$ ions.

The electrolyte 6 is a 1M solution of $LiSO_4$ in water which additionally contains a transition metal complex in a concentration of 0.1M.

In a first working example of the disclosure, the transition metal complex is hexamminecobalt(III). During charging and discharging of the hybrid supercapacitor 1, redox reactions according to the formula 1 proceed in the electrolyte:

$$[Co(NH_3)_6]^{3+} \rightleftharpoons [Co(NH_3)_6]^{4+} + e^- \rightleftharpoons [Co(NH_3)_6]^{6+} + 3e^-$$ (formula 1)

In a second working example of the disclosure, the transition metal complex is a hexacyanocobaltate(III). During charging and discharging of the hybrid supercapacitor 1, redox reactions according to formula 2 proceed in the electrolyte:

$$[Co(CN)_6]^{3-} \rightleftharpoons [Co(CN)_6]^{2-} + e^-$$ (formula 2)

In a third working example of the disclosure, the transition metal complex is hexacyanochromate(III). During charging and discharging of the hybrid supercapacitor 1, redox reactions according to formula 3 proceed in the electrolyte:

$$[Cr(CN)_6]^{3-} \rightleftharpoons [Cr(CN)_6] + 3e^-$$ (formula 3)

In a fourth working example of the disclosure, the transition metal complex is hexathiocyanatoferrate(III). During charging and discharging of the hybrid supercapacitor 1, redox reactions according to formula 4 proceed with ligand exchange in the alkaline electrolyte:

$$[Fe(SCN)_6]^{3-} + OH^- + e^- \rightleftharpoons [Fe(SCN)_5OH]^{4-} + SCN^-$$ (formula 4)

In a fifth working example of the disclosure, the transition metal complex is triperchloratoiron(III). During charging and discharging of the hybrid supercapacitor 1, redox reactions according to formula 5 proceed in the electrolyte:

$$[Fe(ClO_4)_3] + e^- \rightleftharpoons [Fe(ClO_4)_3]^-$$ (formula 5)

In a sixth working example of the disclosure, the transition metal complex is perchloratocopper(II). During charging and discharging of the hybrid supercapacitor 1, redox reactions according to formula 6 proceed in the electrolyte:

$$[Cu(ClO_4)]^+ + e^- \rightleftharpoons [Cu(ClO_4)]$$ (formula 6)

These redox reactions contribute, in addition to the faradaic and capacitive activity of the cathode 2 and of the anode 4, to electric charge storage in the hybrid supercapacitor 1.

What is claimed is:

1. An aqueous electrolyte for a capacitor, the aqueous electrolyte comprising:
   at least one transition metal complex, wherein the at least one transition metal complex contains at least one ligand selected from the group consisting of ammonia, cyanide, perchlorate, thiocyanate and ethylenediaminetetraacetate.

2. The aqueous electrolyte according to claim 1, wherein the at least one transition metal complex contains at least one transition metal selected from the group consisting of cobalt, chromium, iron, copper and titanium.

3. The aqueous electrolyte according to claim 1, wherein the at least one transition metal complex has the formula $ML_x$, where M is the transition metal and L is a ligand selected from the group and x has a value of 2, 4 or 6.

4. An aqueous electrolyte for a capacitor, the aqueous electrolyte comprising:
   at least one transition metal complex, wherein the concentration of the at least one transition metal complex in the aqueous electrolyte is in a range from 0.01 mol/l to 0.5 mol/l.

5. An aqueous electrolyte for a capacitor, the aqueous electrolyte comprising:
   at least one transition metal complex; and
   sulfuric acid and/or at least one alkali metal salt and/or at least one alkaline earth metal salt.

6. A hybrid supercapacitor, comprising:
   an aqueous electrolyte containing at least one transition metal complex.

* * * * *